May 7, 1940.   J. C. ROGERS ET AL   2,199,860
WEATHER STRIP DEVICE
Filed Aug. 13, 1938
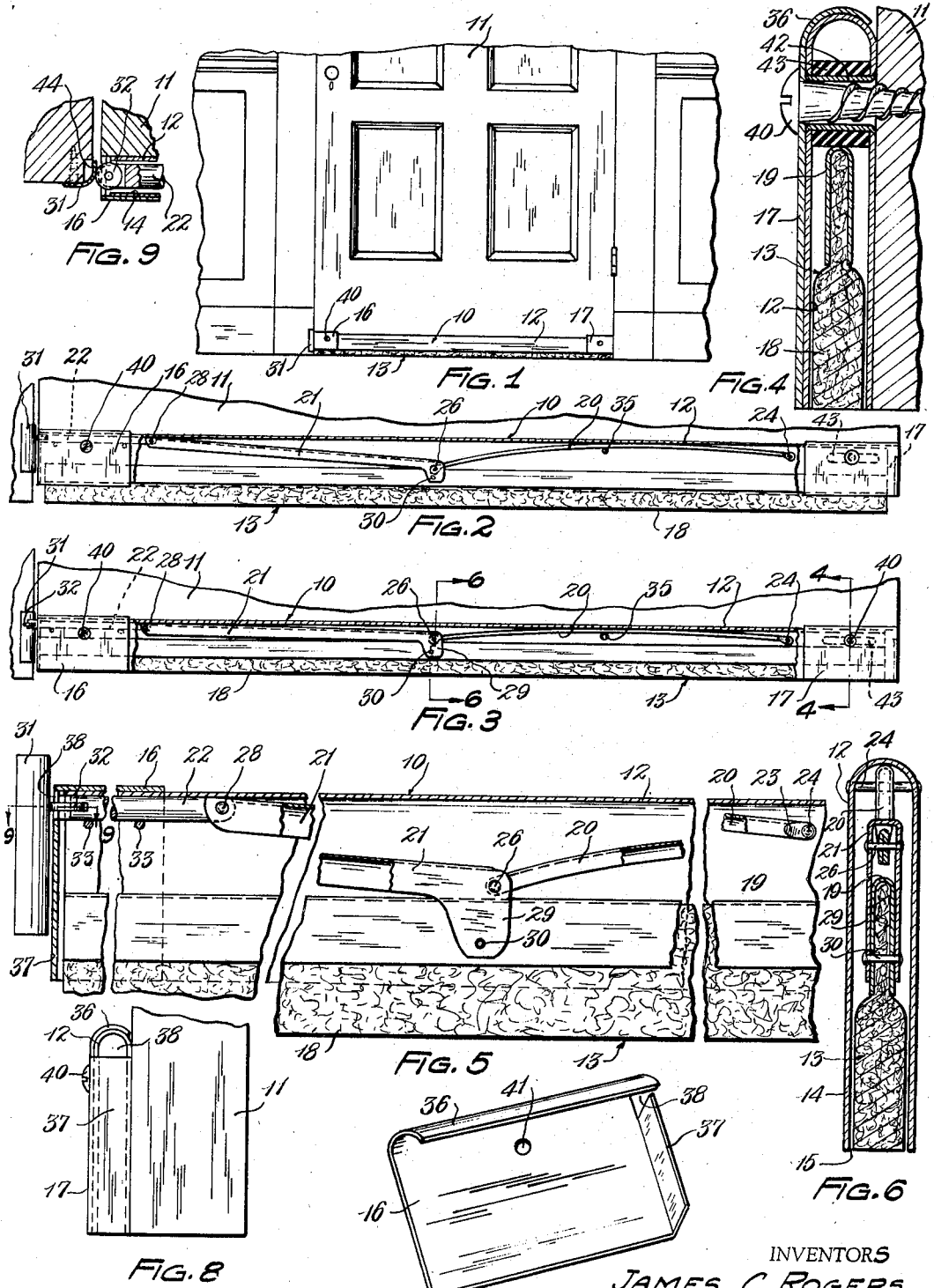
INVENTORS
JAMES C. ROGERS
JAMES F. ROGERS
BY Kwis Hudson & Kent
ATTORNEYS Patented May 7, 1940

2,199,860

UNITED STATES PATENT OFFICE 2,199,860

WEATHER STRIP DEVICE

James C. Rogers and James F. Rogers,
Rocky River, Ohio

Application August 13, 1938, Serial No. 224,764

8 Claims. (Cl. 20—68)

This invention relates to weather strip devices, and more particularly to a device of this kind adapted to be attached to a door and having a sealing member which is automatically projected or retracted when the door is moved to closed or open position.

An object of our invention is to provide an improved weather strip device of this character, of simple and economical construction and which can be easily and quickly applied to a door or the like without need for special tools or unusual skill.

Another object of our invention is to provide an improved weather strip device having an elongated sealing member and an elongated flexible actuating means therefor and in which such flexible actuating means comprises connected sections, one of which is a spring of the flexible-bar type.

A further object of our invention is to provide a weather strip device, of the type mentioned, in which a spring of the flexible-bar type is adapted to be deflected for projecting the sealing member and an elongated substantially rigid element serves to transmit thrust to the spring for deflecting the same.

A further object of our invention is to provide an improved construction for a weather strip device in which provision is made for obtaining a quiet operation of the device and for adjustment of the device in length to correspond with the width of the door to which it is to be applied.

Our invention may be further briefly summarized as consisting in certain novel combination and arrangements of parts hereinafter described and particularly set out in the appended claims.

In the accompanying sheet of drawings,

Fig. 1 is an elevational view showing a door having our improved weather strip device attached thereto adjacent its lower edge.

Fig. 2 is a side view of the device showing the same with a portion of the casing broken away and with the sealing member in its extended position.

Fig. 3 is a side view similar to that of Fig. 2, but showing the sealing member in its retracted position.

Fig. 4 is a transverse sectional view taken through the device as indicated by line 4—4 of Fig. 3.

Fig. 5 is a partial side view of the device showing the same on a larger scale than in Fig. 2 and with the casing broken away to show the relative positions of the parts when the sealing member is in its extended position.

Fig. 6 is another transverse sectional view of the device taken as indicated by line 6—6 of Fig. 3.

Fig. 7 is a detached perspective view showing one of the end plates.

Fig. 8 is an end view of the device showing the same applied to a door and with an end plate in position on the casing, and Fig. 9 is a partial transverse sectional view taken through the striker plate and adjacent end of our weather strip device, as indicated by line 9—9 of Fig. 5.

We will now proceed with a more detailed description of our weather strip device, but in so doing it should be understood that although we have illustrated but one embodiment thereof, our invention may be embodied in various other forms and constructions for similar devices coming within the scope of the appended claims.

In Fig. 1 of the drawing we show our weather strip device 10 mounted on a door 11 adjacent the lower edge thereof and extending for substantially the full width of the door. As will be presently explained more in detail our weather strip device is of the type having a casing 12 constructed to provide a slot-like opening along the lower edge thereof and having an elongated sealing member 13 contained in the casing and adapted to be automatically projected therefrom, as the door moves to its closed position, for sealing the crack or opening between the lower edge of the door and the floor or threshold.

As shown in the drawing, the casing 12 may be an elongated sheet metal structure of U-like cross-sectional shape having substantially parallel side walls 14. The casing may be formed by bending a strip of sheet metal to the U-like form shown in Fig. 6, thus providing a main casing structure which is open at its ends and has a slot-like opening 15 extending along its lower edge. The casing can be adjusted as to length and the ends of the casing may be closed or substantially closed by means of the casing sections or end plates 16 and 17 which will be described more fully hereinafter.

The sealing member 13 may comprise a packing strip 18 of suitable resilient material, such as felt, sponge rubber or the like, and a holder or channel strip 19 in which the packing strip is mounted. The channel strip 19 may be a sheet metal member of U-like form having the upper edge of the packing strip 18 extending thereinto and which grips or otherwise holds the packing strip. The sealing member 13 extends for the full length of the casing 12, except for slight clearance spaces at its ends and is freely movable in the casing, so that it can be projected through the slot-like opening 15 thereof, as shown in Figs. 1, 2 and 5 or can be retracted into the casing, as shown in Figs. 3, 4 and 6.

For actuating the sealing member 13 to thus project or retract the same, we provide actuating means of simple and economical construction and which embodies a minimum number of parts. As shown in the drawing, this actuating means may comprise an elongated spring 20 of the flexible-bar type, a rigid element 21 and a push rod 22. The elongated spring 20 extends longitudinally in the casing and normally acts to retract the sealing member thereinto. This spring is adapted to be deflected transversely thereof by motion transmitted thereto by the rigid element or link 21 to thereby cause the sealing member to be projected from the casing. This spring may be of any suitable construction, such as the transversely flexible channel-shaped bar shown in this instance, although a flexible solid or flat bar could be used. The spring preferably has openings or eyes at the ends thereof so that its remote end 23 can be anchored on the casing as by means of a transverse pin 24 extending therethrough and its end adjacent the push rod 22 can be pivotally connected with the rigid element 21 by means of a transverse pivot pin 26.

The rigid element 21, which serves as a thrust member and also supports the sealing member 13, may be an elongated bar or lever which has its outer end connected with the inner end of the push rod 22 as by means of a pivot pin 28 and its inner end 29 connected with the sealing member by means of a pivot pin 30. For economy of construction the element 21 may be formed from sheet metal and may be of channel-like cross-sectional shape. The inner end 29 of this member may have downwardly extending spaced arms providing a forked portion which receives or straddles the channel strip 19 of the sealing member 13. The channel-like construction for the element 21 also facilitates the connection of the spring 20 and the push rod 22 therewith, because the ends of these members can be readily inserted into the channel recess of the element.

The push rod 22 may be a substantially rigid metal bar of round or other desired cross section, which projects from the end of the casing 12 to provide an actuating part adapted to engage a striker plate 31 mounted on the door frame. To improve the operation of our weather strip device we prefer to provide the outer end of the push bar 22 with a small roller or sheave 32 which engages and traverses the striker 31 when the door approaches its closed position. The push bar 22 may be supported and guided during its longitudinal movement in the casing by any suitable means, such as the longitudinally spaced pins 33 which extend transversely of the casing.

In the operation of our improved weather strip device the roller 32 engages the striker 31 as the door 11 approaches its closed position causing inward movement of the push rod 22. Such inward movement of the push rod is transmitted directly to the adjacent end of the spring 20 by the rigid element 21 causing the spring to be bowed or deflected downwardly to the position shown in Fig. 2. This bowing or deflecting of the spring 20 causes the inner end of the element 21 to be shifted downwardly in the casing, thereby projecting the sealing member through the slot-like opening 16 to its extended position shown in Figs. 1, 2 and 5. When the door starts its opening movement the roller 32 disengages the striker 31, whereupon the spring 20 returns to a substantially straight condition, as shown in Fig. 3, thereby lifting the sealing member and retracting the same into the casing. The straightening of the spring 20 also lifts the element 21 and causes the push rod 22 to be projected from the end of the casing. Since the sealing member 13 is supported at only a single point, that is, by the pivot pin 30 which is at or adjacent its midpoint, it will be seen that the sealing member can rock about this pivot pin and will be able to adjust itself to floor irregularities while being projected from the casing.

For controlling the deflection of the spring 20, as well as to support and position the same in the casing, we may provide a support at an intermediate point of the spring, such as the pin 35 which extends transversely of the casing. The use of this pin improves the action of the spring and enables the same to cooperate with the element 21 in supporting and moving the sealing member 13.

As shown in Figs. 7 and 8, the casing sections or end plates 16 and 17 may be of sheet metal construction and each may have a hook-like flange 36 along the top edge and a right-angle flange 37 at the outer end. The end flange 37 preferably does not join the top flange 36 but terminates short thereof, leaving a space or opening 38 for accommodating the push rod 22.

In mounting our weather strip device on a door the end plates 16 and 17 are first applied to ends of the main casing in the proper order and the assembly is then placed against the door and attached thereto by the screws 40. When the end plates 16 and 17 are applied to the ends of the casing 12, the flanges 36 and 37 of the plates engage the top and end edges of the casing as shown in Figs. 2, 3 and 8. When the plates are thus applied to the casing the flanges 37 extend transversely of the casing and form closures for the ends thereof. The screws 40 extend through the holes 41 of the end plates 16 and 17 and also extend through the side walls of the casing 12. To prevent the screws from pinching or deflecting the side walls of the casing we may provide the latter with hollow metal rivets or bushings 42 at the points where the screws extend therethrough.

An important function of the end plates 16 and 17 is to provide for adjustment in the length of the casing of our weather strip device and, for this purpose one of the end plates, in this instance the end plate 17, is shiftable. To permit shifting of this end plate we make the corresponding openings in the side walls of the main casing in the form of slots 43, so that the end plate and its attaching screw may be shifted longitudinally of the casing to bring the end flange 37 substantially flush with the edge of the door. Since doors frequently vary half an inch or more in width, we find it desirable to construct the casing 12 a little shorter than the standard door width and to adjust the end plate 17 out to the edge of the door in the manner just explained. In this way it is possible to avoid cutting of the casing 12 and to still have the installed device correspond exactly with the width of the door by merely trimming the sealing member to proper length and adjusting the end plate 17. The end plate 16 need not be shiftable but is preferably used to give the device a finished and symmetrical appearance.

In mounting our weather strip device on doors it is preferable to have the push rod 22 located at the knob edge of the door because a more satisfactory operation of the sealing member is obtained, although, if desired, the device may be mounted on the door with the push rod projecting from the hinge edge thereof. To provide for this alternative mounting of the device on the door, as well as to provide for mounting of the device on either side of the door, it would ordinarily be necessary to construct these devices of both right and left hand form. This would require duplication of tools and the stocking of a larger number of the completed devices. To overcome these disadvantages we construct our weather strip device so that it is suitable for either right or left hand mounting on the door and can be adapted for such right or left hand use, by means of the above mentioned end plates 16 and 17. These end plates or casing sections are made in pairs, that is to say, a set of two such plates comprises one right hand plate and one left hand plate.

To eliminate noise in the operation of our weather strip device, such as might otherwise result from engagement of the metal channel strip 19 against the bushings 42 during the retracting of the sealing member, we provide cushioning or bumper elements 43 on these bushings. These cushioning elements may be bushings formed of rubber or other suitable resilient material and which surround the metal bushings 42.

It will be observed that the extent which the sealing member 13 is projected from the casing depends upon the travel imparted to the push rod 22 and is not necessarily fixed as in the case of certain weather strip devices which employ cams for projecting the sealing member. To provide for variation in the outward movement of the sealing member, we construct the striker plate 31 so that its position relative to the adjacent end of the weather strip device 10 can be adjusted. Preferably, the striker is made of sheet metal and is curved to provide better cooperation with the roller of the push rod and also to permit bending toward or from the device 10 for adjustment of the extent of outward movement of the sealing member 13. When the free flange 44 of the striker is bent away from the door frame and toward the device 10, by means of a suitable tool, it will cause greater travel of the push rod 22 and the sealing member 13 will be projected farther as the door moves to its closed position. On the other hand, if the flange 44 of the striker is bent to a setting closer to the door frame, the outward movement of the sealing member will be less.

From the foregoing description and the accompanying drawing it will now be readily seen that we have provided an improved weather strip device which can be easily applied to the lower edge of a door without need for special tools or unusual skill. It will also be seen that our weather strip device comprises a minimum number of parts and, therefore, can be economically manufactured and assembled. The flexible actuating means which we provide for projecting and retracting the sealing member insures smooth, quiet and positive actuation of the sealing member.

While we have illustrated and described our improved weather strip device in a somewhat detailed manner, it will be understood, of course, that we do not wish to be limited to the precise details of construction and arrangements of parts herein disclosed, but regard our invention as including such changes and modifications as do not constitute a departure from the spirit of the invention and the scope of the appended claims.

Having thus described our invention we claim:

1. In a weather strip device, an elongated casing having a slot-like opening, an elongated sealing member in the casing adapted to be projected through said opening, and operating means for the sealing member comprising a push rod projecting from the casing and an elongated flexible member connected adjacent its respective ends with the casing and the push rod and connected at an intermediate point thereof with said sealing member, said flexible member comprising sections connected with each other one of which is rigid and adapted for combined swinging and longitudinal bodily shifting in the casing and the other of which is a spring of the flexible-bar type adapted to be bowed by longitudinally acting thrust.

2. In a weather strip device, an elongated casing, an elongated sealing member movable therein, a push rod projecting from the casing, a bar spring extending longitudinally in the casing, and a rigid element extending between the push rod and the adjacent end of the spring and also having an operating connection with the sealing member, said rigid element being swingable in the casing and also bodily shiftable longitudinally of the latter to cause bowing of the spring and actuation of the sealing member.

3. In a weather strip device, an elongated casing having a slot-like opening, an elongated sealing member in the casing adapted to be projected through said opening, and operating means connected with the sealing member comprising a push rod movable in the casing and projecting from one end thereof, a spring of the flexible-bar type extending longitudinally in the casing and connected therewith at a point adjacent the other end of the casing, and a rigid element extending between said push rod and the adjacent end of the spring and adapted for combined swinging and longitudinal bodily shifting in the casing to transmit motion for flexing the spring in a direction to project said sealing member from the casing.

4. In a weather strip device, an elongated casing having a slot-like opening, an elongated sealing member in the casing adapted to be projected through said opening, and operating means for the sealing member comprising a push rod movable in the casing and projecting therefrom, a spring of the flexible-bar type extending longitudinally in the casing and connected adjacent its remote end with the casing, an elongated rigid element having one end connected with said push rod and its other end in engagement with said spring for transmitting thrust thereto, said rigid element being swingable relative to the push rod and also bodily shiftable longitudinally of the casing to cause bowing of the spring in response to said thrust, and means connecting the sealing member with said other end of the rigid element.

5. In a weather strip device, an elongated casing, an elongated sealing member movable therein, a push rod projecting from the casing, a bar spring extending longitudinally in the casing, and a rigid element extending between the push rod and the adjacent end of the spring for transmitting thrust to the latter, said rigid element having pivotal connection with said push rod for combined swinging and longitudinal bodily shifting in the casing in response to movement of the push rod and also having a forked portion at its inner end straddling the sealing member adjacent its longitudinal midpoint.

6. In a weather strip device, an elongated casing, an elongated sealing member movable therein, a push rod projecting from the casing, a bar spring extending longitudinally in the casing, a rigid element extending between the push rod and the adjacent end of the spring for transmitting thrust to the latter and also having an operating connection with the sealing member, said rigid element comprising a link having pivotal connection with the push rod and adapted for both swinging and longitudinal bodily shifting in the casing, and a supporting means engaging the spring at an intermediate point thereof.

7. In a weather strip device, a casing, a sealing member movable therein, hollow elements on the casing adapted to accommodate attaching devices, and resilient bumper means on the hollow elements adapted to be engaged by the sealing member.

8. In a weather strip device, a casing, a sealing member movable therein, metal bushings extending transversely of the casing and adapted to accommodate attaching devices, and bushings of resilient material surrounding said metal bushings for cushioning the engagement of said sealing member therewith.

JAMES C. ROGERS.
JAMES F. ROGERS.